United States Patent [19]

York

[11] Patent Number: 5,000,627
[45] Date of Patent: Mar. 19, 1991

[54] APPARATUS FOR ADJUSTING RADIAL DISPLACEMENT FROM ROTATABLE SHAFT

[76] Inventor: Ronald A. York, 1971 Island Highway, Campbell River, B.C., Canada, V9W 2G3

[21] Appl. No.: 383,978

[22] Filed: Jul. 24, 1989

[51] Int. Cl.$^5$ .............................................. B23B 51/00
[52] U.S. Cl. ..................................... 408/16; 408/185; 408/181; 81/436
[58] Field of Search ................. 408/181, 16, 153, 197, 408/185, 710; 81/436, 488, DIG. 5, 184; 33/571, 679.1, 783, 792, 794, 800; 279/117

[56] References Cited

U.S. PATENT DOCUMENTS

| | | | |
|---|---|---|---|
| 1,144,795 | 6/1915 | Schmelzkopf | 81/436 X |
| 1,746,381 | 2/1930 | Davis | 81/436 X |
| 2,359,957 | 10/1944 | Zempel | 408/181 |
| 4,018,542 | 4/1977 | Linsay | 408/181 X |
| 4,111,079 | 9/1978 | Derbyshire | 279/117 X |
| 4,638,541 | 1/1987 | Schindler, Jr. | 408/181 X |
| 4,710,073 | 12/1987 | Peterson | 408/181 |

FOREIGN PATENT DOCUMENTS 3508434 9/1985 Fed. Rep. of Germany ...... 408/181

OTHER PUBLICATIONS

DeVlieg Microbore brochure.

*Primary Examiner*—Z. R. Bilinsky
*Assistant Examiner*—Robert Schultz
*Attorney, Agent, or Firm*—Barrigar & Oyen

[57] ABSTRACT

Apparatus for adjusting the radial displacement of a member, such as a tool bit, from a rotational shaft, such as a boring bar used in a boring operation. An aperture in the boring bar supports the tool bit, allowing it to protrude radially outwardly from the boring bar. An adjustable feed mechanism in the aperture adjustably feeds the tool bit along the aperture. An adjusting mechanism couples with and facilitates adjustment of the feed mechanism. A calibrating mechanism on the adjusting mechanism, and on the boring bar, calibrates adjustment of the feed mechanism by the adjusting mechanism.

5 Claims, 3 Drawing Sheets

APPARATUS FOR ADJUSTING RADIAL DISPLACEMENT FROM ROTATABLE SHAFT

FIELD OF THE INVENTION

This invention pertains to apparatus for adjusting the radial displacement by which a member, such as a tool bit, protrudes from a rotatable shaft, such as a boring bar.

BACKGROUND OF THE INVENTION

There are a variety of situations in which it is necessary to make careful, minute adjustments of the amount by which a member protrudes radially outwardly from a rotatable shaft. One such situation is encountered in a boring operation in which one or more tool bits are mounted on and protrude radially outwardly from a rotatable boring bar. The boring bar is aligned within a cylindrical aperture in a work piece and then rotated. The tool bit(s) cut into the work piece, removing material therefrom, to enlarge the aperture. The amount of material removed from the work piece depends upon the displacement between the tip of the tool bit(s) and the longitudinal axis of the boring bar. This displacement must be carefully adjusted to ensure that the correct amount of material is removed from the work piece, leaving a cylindrical aperture of selected diameter in the work piece.

Conventionally, boring machine tool bits are provided in adjustable, calibrated cartridges having threaded outer casings. Typical prior art cartridges are sold by DeVlieg Machine Company of Royal Oak, Mich. under the trademark MICROBORE. A large selection of cartridges of varying lengths and having tool bits with different cutting characteristics are available.

The boring bar is provided with a series of apertures which pass transversely through the bar at selected intervals. A particular boring bar aperture is selected to receive the tool bit cartridge. A pair of opposed keyways are machined into the bar on one side of the selected aperture to mate with a pair of keys provided on the cartridge opposite the tool bit. A cartridge of appropriate length and having an appropriate tool bit is selected and passed through the boring bar aperture so that the cartridge's keys fit within the boring bar keyways. A lock screw threaded through a solid washer is further threaded into the keyed end of the cartridge until the washer butts against the outer surface of the boring bar. The threaded cartridge casing and tool bit protrude through the opposite side of the boring bar. An internally threaded graduated dial ring is threaded over the protruding casing. The cartridge is thus held in place between the washer and the dial ring. The displacement between the tip of the tool bit and the longitudinal axis of the boring bar is adjusted by loosening the lock screw to draw the washer away from the boring bar, turning the threaded dial by the required amount (as determined by indicator marks provided on the dial) and then retightening the lock screw.

The prior art cartridge-based system suffers a number of disadvantages. A considerable amount of preliminary machining must be performed on the boring bar so that it will mate properly with the cartridge. The cartridge may be adjusted only within a narrow range, necessitating the provision of a range of different cartridges to facilitate boring of apertures of different diameters. This represents a potentially significant expense. It is also awkward to adjust the cartridges accurately during the boring operation.

The present invention overcomes the foregoing disadvantages by eliminating the need for multiple tool bit cartridges and by providing a calibrating tool separate from the tool bit holder to facilitate rapid, easy, precise adjustment of the displacement between the tip of the tool bit and the longitudinal axis of the boring bar.

SUMMARY OF THE INVENTION

In accordance with the preferred embodiment, the invention provides an apparatus for adjusting the radial displacement of a member, such as a tool bit, from a rotatable shaft, such as a boring bar. An aperture in the shaft supports the member and allows it to protrude radially outwardly from the shaft. Adjustable feed means are provided in the aperture, for adjustably feeding the member along the aperture. Adjusting means are provided for coupling with and adjusting the feed means. Calibrating means are provided on the adjusting means and on the shaft, for calibrating adjustment of the feed means by the adjusting means. Releasable securing means are provided for releasably securing the member within the aperture.

Advantageously, the adjustable feed means comprises a plug threadably mounted in one end of the aperture. The plug has an inner end for bearing against the member, and an outer end for coupling with the adjusting means. The adjusting means is coupled with the plug, and then rotated to threadably advance or retract the plug (and thus the member) along the aperture.

Preferably, the calibrating means on the adjusting means comprises a calibrated bezel rotatable with the adjusting means; and, the calibrating means on the shaft comprises a reference mark alignable with the bezel when the adjusting means is coupled with the plug.

The adjusting means may comprise a rod, such as a screwdriver, in which case the bezel is preferably centred around one end of the rod. Biasing means may advantageously be provided for biasing the bezel toward said one end of the rod. Alternatively, the adjusting means may comprise a wrench having a head engagable with the plug, in which case the bezel is preferably centred around the wrench head. Biasing means may also advantageously be provided for biasing the bezel toward the shaft when the wrench is engaged with the plug.

DETAILED DESCRIPTION OF THE PREFERRED EMBODIMENT

Figure 1:
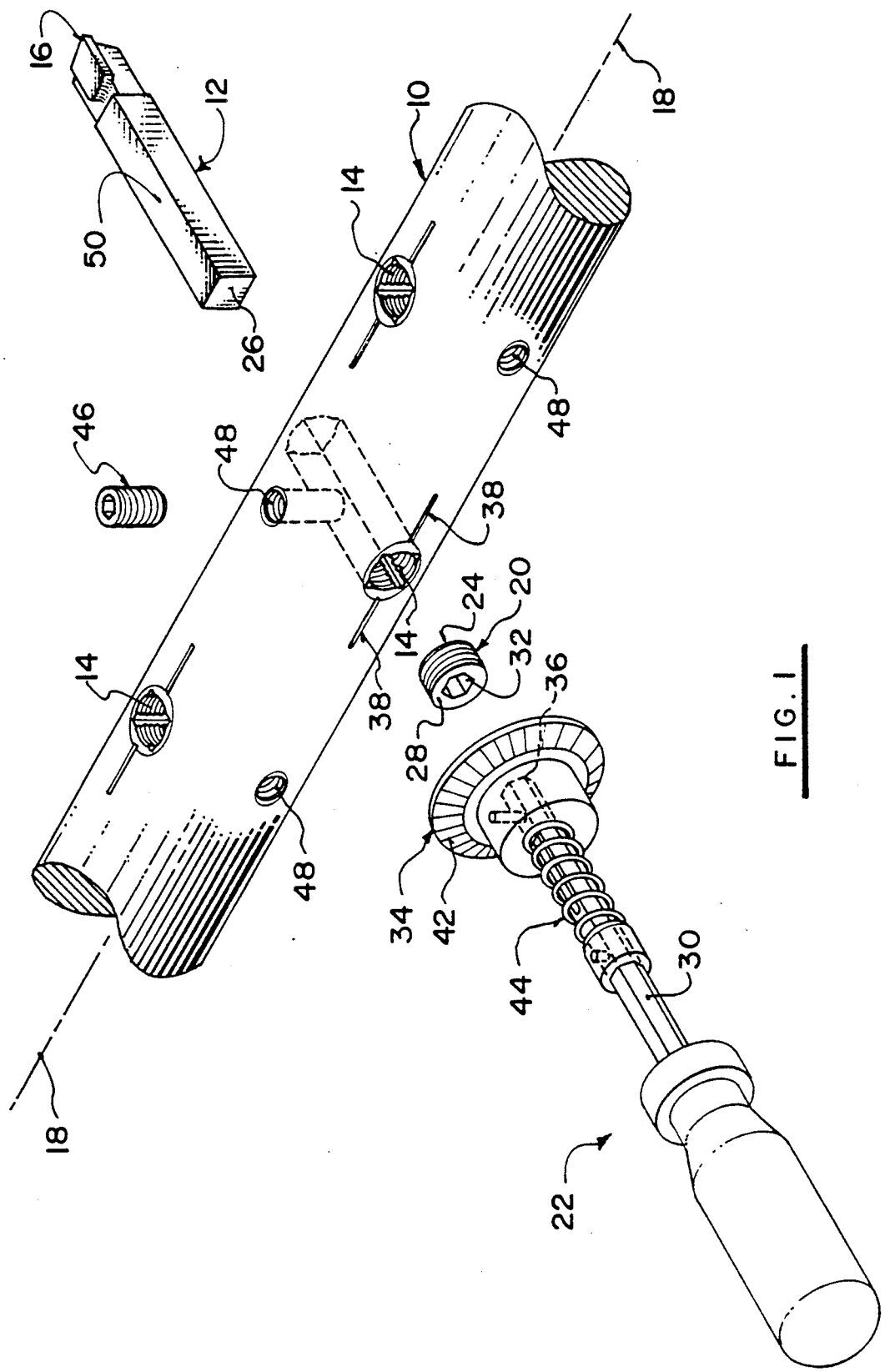
FIG. 1 is an exploded pictorial illustration of a boring bar, tool bit, and adjusting tool constructed in accordance with the preferred embodiment of the invention.
Figure 2:
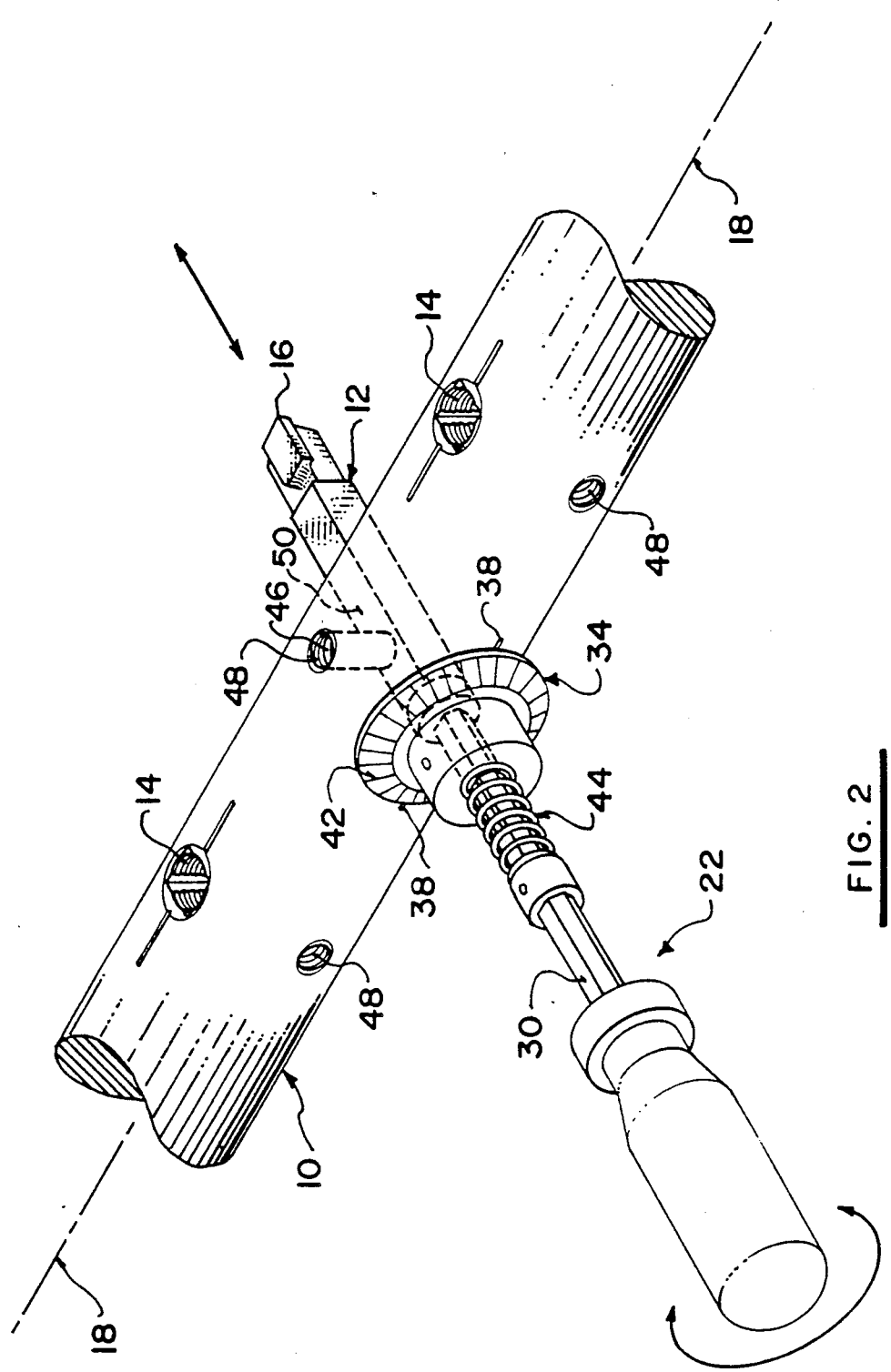
FIG. 2 illustrates the components of FIG. 1 assembled for operation, with the adjusting tool positioned to adjust the radial displacement of the tool bit from the boring bar.

The drawings illustrate a rotatable shaft, namely a conventional boring bar 10, from which a member, namely tool bit 12, protrudes. One or more internally threaded, square-cornered apertures 14 are provided in boring bar 10 to support one or more square cross-sectioned tool bits 12, allowing the tool bit(s) to protrude radially outwardly from boring bar 10. The displacement between the protruding tip 16 of tool bit 12, and the longitudinal axis 18 of boring bar 10, determines the diameter of the cut made by tool bit 12 when boring bar 10 is rotated in conventional fashion.

An "adjustable feed means"; namely, threaded plug 20, is threadably mounted in one end of aperture 14, for adjustably feeding tool bit 12 along aperture 14, as hereinafter explained. An "adjusting means"; namely, tool 22, is provided for coupling with and adjusting plug 20 as hereinafter explained. Plug 20 has an inner end 24 for bearing against the base 26 of tool bit 12, and an outer end 28 for coupling with tool 22.

In the preferred embodiment, tool 22 takes the form of a screwdriver having a hexagonally cross-sectioned, rod-like shaft 30 for mating within a hexagonal aperture 32 in plug outer end 28. By inserting shaft 30 in plug aperture 32 and then rotating shaft 30, plug 20 may be threadably advanced or retracted along aperture 14. More particularly, threaded advancement of plug 20 along aperture 14 causes plug inner end 24 to bear against tool bit base 26, pushing tool bit 12 along aperture 14 and increasing the displacement between tool bit tip 16 and boring bar axis 18. Threaded retraction of plug 20 along aperture 14 draws plug inner end 24 away from tool bit base 26, allowing tool bit 12 to be pushed inwardly along aperture 14, decreasing the displacement between tool bit tip 16 and boring bar axis 18.

A "calibrating means"; namely, calibrated bezel 34 is provided on tool 22, for calibrating the advancement or retraction of plug 20 along aperture 14 by tool 22. Bezel 34 is centrally fixed around end 36 of shaft 30 for rotation with shaft 30. The "calibrating means" also comprises reference mark 38 on boring bar 10. When tool 22 is coupled with plug 20, reference mark 38 is aligned with bezel 34 as hereinafter explained to precisely regulate advancement or retraction of plug 20 along aperture 14. In the preferred embodiment, fifty equally spaced calibration marks 42 are provided around the circumference of bezel 34; and, twenty threads per inch are provided on plug 20 and the mating internal threads of aperture 14. This facilitates advancement or retraction of plug 20 (and thus tool bit 12) along aperture 14 in 0.001" increments. That is, if tool shaft end 36 is positioned within plug aperture 32, with one of calibration marks 42 aligned over reference mark 38, then rotation of tool 22 to bring either of the immediately adjacent calibration marks over reference mark 38 advances or retracts plug 20 (and thus tool bit 12) by precisely 0.001", depending on the direction of rotation of tool 22.

Figure 3:
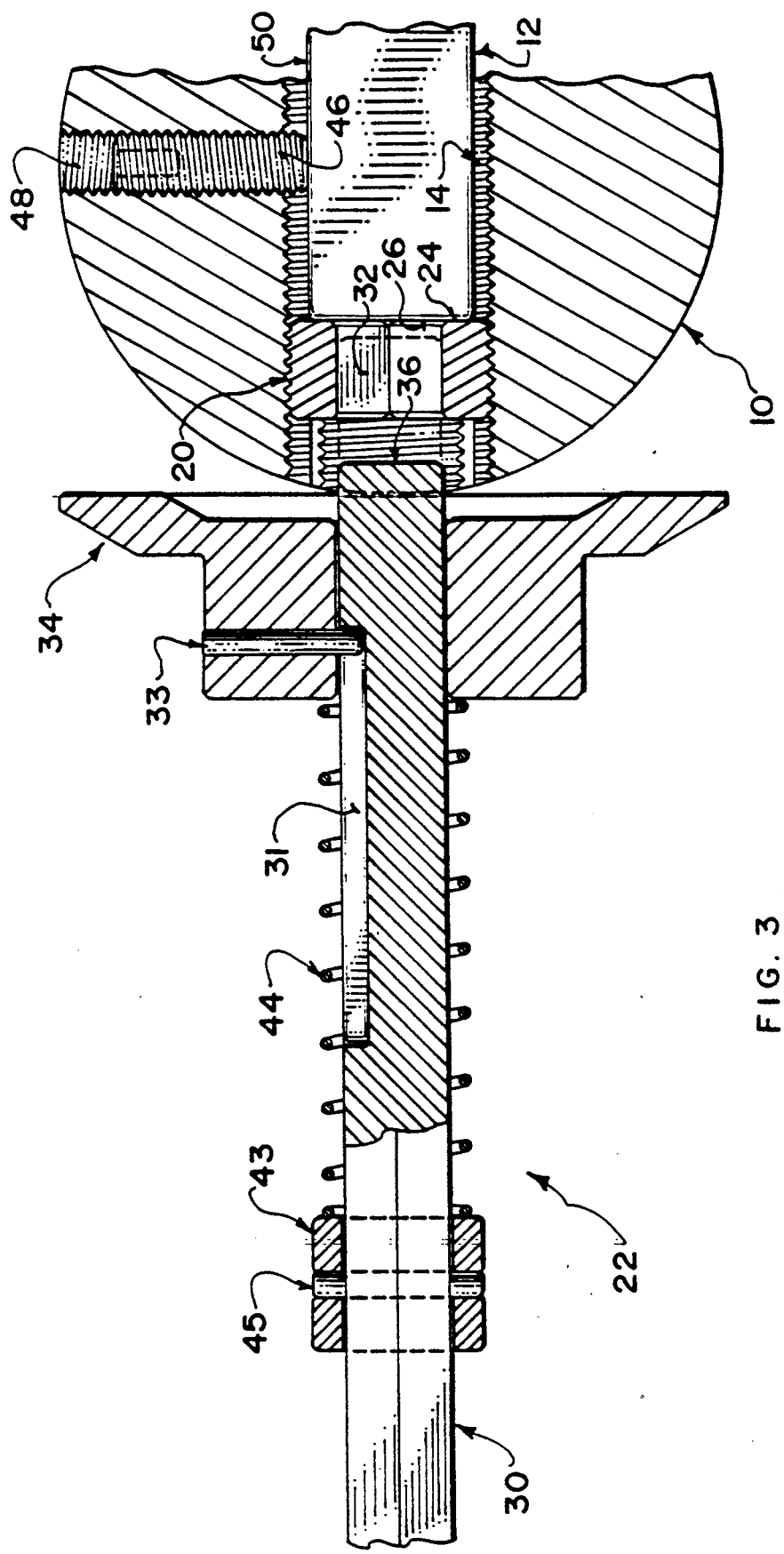
FIG. 3 is an enlarged, cross-sectional side view of the adjusting tool and boring bar of FIG. 2.

A "biasing means"; namely, spring 44 is provided on shaft 30 to bias bezel 34 toward shaft end 36, thus ensuring that calibration marks 42 remain closely proximate reference mark 38 throughout the adjusting operation during which tool 22 is coupled with plug 20. As best seen in FIG. 3, a longitudinal groove 31 is cut into shaft 30. Pin 33 projects through bezel 34 into groove 31, preventing rotation of bezel 34 around shaft 30, while permitting longitudinal displacement of bezel 34 along shaft 30. Groove 31 and pin 33 thus together comprise a "bezel support means" for supporting bezel 34 on shaft 30 as aforesaid. Stop collar 43 is held in place on shaft 30 by pin 45 to brace the end of spring 44.

In operation, plug 20 is threaded into one end of aperture 14 and tool bit 12 is inserted into the opposite end of aperture 14 until tool bit base 26 bears against plug inner end 24. The displacement between tool bit tip 16 and boring bar axis 18 is then roughly adjusted to equal an amount less than the radius of the cut which is to be made in the work piece (not shown). A "releasable securing means"; namely set screw 46, is then tightened within boring bar aperture 48, against the outer surface 50 of tool bit 12, to releasably secure tool bit 12 within aperture 14. A trial cut is then made in the work piece by rotating boring bar 10 in conventional fashion. The diameter of the trial cut is measured, and the additional depth of cut required to enlarge the cut to its required diameter is calculated. The calculated amount is halved to yield the displacement, in thousandths of an inch, by which tool bit tip 16 must be advanced from boring bar axis 18 to complete the cut. Set screw 46 is then loosened to release tool bit 12. Tool shaft end 36 is inserted within plug aperture 32, placing bezel 34 against boring bar 10. The position of calibration marks 42 relative to reference mark 38 is noted. Tool 22 is then rotated to advance a suitable number of calibration marks 42 past reference mark 38, advancing tool bit 12 by the required amount. Set screw 46 is then retightened and boring bar 10 again rotated to complete the cut.

As will be apparent to those skilled in the art in the light of the foregoing disclosure, many alterations and modifications are possible in the practice of this invention without departing from the spirit or scope thereof. For example, tool 22 need not take the form of a screwdriver or have a rod-like shaft. Instead tool 22 may take the form of a wrench (not shown) having a head engagable with a mating protrusion on the adjustable feed means, in which case calibrating bezel 34 may be centred around the wrench head. Biasing means may be provided to bias the wrench bezel toward boring bar 10 when the wrench head is engaged with the feed means. Accordingly, the scope of the invention is to be construed in accordance with the substance defined by the following claims.

I claim:

1. Apparatus for adjusting the radial displacement of a member from an aperture in a rotatable shaft, said apparatus comprising:
   (a) an adjusting rod;
   (b) a plug threadable into one end of said aperture, said plug having an inner end for bearing against said member and an outer end for coupling with said adjusting rod;
   (c) coupling means on said plug outer end and on said adjusting rod for rotatably coupling said adjusting rod to said plug;
   (d) a calibrated bezel centered around and rotatable with said adjusting rod;
   (e) biasing means for biasing said bezel toward one end of said rod;
   (f) a reference mark on said shaft alignable with said bezel when said adjusting rod is coupled with said plug;
   (g) releasable securing means for releasably securing said member within said aperture; and,
   (h) bezel support means for preventing rotation of said bezel about said rod and for permitting slidable displacement of said bezel along said rod;

wherein rotation of said adjusting rod, when said adjusting rod is coupled with said plug, advances or retracts said plug along said aperture.

2. Apparatus as defined in claim 1, wherein said rod comprises a screwdriver.

3. Apparatus as defined in claim 1, wherein said bezel support means comprises:

(a) a groove in said rod; and,
(b) a pin projecting through said bezel into said groove.

4. Apparatus for adjusting the radial displacement of a member from an aperture in a rotatable shaft, said apparatus comprising:
   (a) an adjusting wrench;
   (b) a plug threadable into one end of said aperture, said plug having an inner end for bearing against said member and an outer end adapted to be rotatably coupled with a head of said wrench;
   (c) a calibrated bezel centered around the head of said wrench;
   (d) bezel support means for preventing rotation of said bezel about said wrench head and for permitting slidable displacement of said bezel along said wrench head;
   (e) biasing means for biasing said bezel toward said shaft when said wrench is engaged with said plug;
   (f) a reference mark on said shaft alignable with said bezel when said wrench is coupled with said plug;
   (g) releasable securing means for releasably securing said member within said aperture;
   wherein rotation of said wrench, when said wrench is coupled with said plug, advances or retracts said plug along said aperture.

5. Apparatus as defined in claim 4, wherein said bezel support means comprises:
   (a) a groove in said wrench head; and,
   (b) a pin projecting through said bezel into said groove.

* * * * *